Patented July 28, 1931

1,816,764

UNITED STATES PATENT OFFICE

YVES CORNIC, OF ASNIERES, FRANCE

ARTIFICIAL SPONGE AND PROCESS OF MANUFACTURE THEREOF

No Drawing. Application filed June 26, 1929, Serial No. 373,937, and in Belgium June 29, 1928.

As is known in the art sponges are made of rubber from saturated mixtures which are vulcanized in a special way.

This type of sponge which is very widely prevalent in commerce possesses certain disadvantages. First of all these sponges are not very strong and become torn after a certain length of time in use and, in addition, their net cost is still rather high, besides they have most always a red or orange coloration and do not at all resemble natural sponges which are white or slightly yellow, and finally, by their texture, the sponges of rubber possess a hacked aspect, whereas the natural sponges have an alveolate aspect.

In artificial sponges the texture is uniform which causes them not to hold water, that is, they do not act as a sponge, whereas fine natural sponges have small outer pores which gradually increase in size from the exterior toward the interior.

The present invention relates to a process for the manufacture of artificial sponges of rubber with a net cost which is not very high, which are extremely strong whose texture resembles a natural sponge and whose color normally white may be made any color by the introduction of coloring.

Said process consists in starting with latex either as it comes from the tree, or as found in commerce, that is, after it has been stabilized in known manner to prevent coagulation and eventually concentrated and in treating the said latex in a way to impart thereto a spongy consistency.

Said latex is treated with chemical products having for a purpose to coat bodies or mixtures of bodies liberating gases such as $CO_2$ and $NH_3$ with rubber originating from the coagulation of said latex even on said bodies.

I thus coat each particle giving rise to gases with a coat of rubber.

In addition to these coagulators there is obviously utilized sulfur or sulfides which, during the reaction and baking give sulfur, sulfur color, etc.

I have found by treating the latex that if I mix the latex with organic bases and with carbonate of ammonia, there is produced a coagulation originating from the action of said bases upon the latter.

Guanidine, diphenylguanidine, diorthotolylguanidine and the like act perfectly as bases and furthermore are accelerators of vulcanization.

The baking can take place in a drying oven preferably containing an inert gas or superheated steam at the desired temperature or in the midst of a liquid which is a non-solvent of rubber such as glycerine or the like.

For the baking operation I may gradually raise to the vulcanizing temperature or place in the oven directly at that temperature.

Example 100 gms. (or parts by weight) of concentrated latex having 70 to 80% rubber (revertex) are mixed with: 1 gm. of the accelerator base (diphenylguanidine or diorthotolylguanidine), 5 gms. of sulfur, 4 gms. of zinc oxide, 12 ccs. of water.

The whole is mixed and I obtain thus a semifluid paste to which the following is added:

12 gms. of ammonium carbonate sifted, (sieve No. 50:100), I mix and after several moments the latex is completely coagulated. This product is moulded to give the desired shape. I then bake the product for 2 or 3 hours at 140° preferably in a drying oven with an inert atmosphere or in the midst of a liquid in which case the baking operation only lasts from 1 hour to 1 hour and a half.

During the baking operation, the mass swells enormously. I thus obtain a spongy mass covered with an adhering crust of which the pores gradually diminish from the center towards the periphery.

The crust is subsequently removed in any suitable manner such as by grinding and a sponge is obtained whose surface possesses a porous texture which is extremely close.

The sponge is washed by known means such as water, soda, alkali or the like and I obtain a white sponge.

It is to be understood that modifications may be given to the embodiment of my process just disclosed without departing from the spirit of my invention as comprehended within the scope of the appended claims.

In particular the proportions of the constituents may be varied and in addition I may introduce saturating materials such as kaolin, chalk and the like. Finally, the proportion of water may be varied in accordance with the water content of the latex which is employed.

I may also in making the sponge obtain coagulation of the latex by physical means. In fact it is merely necessary to add to the latex coagulators which are slow acting and known in the art such as sulfate of magnesia, alum, magnesia, chalk and the like. These products serve at the same time as saturating products. In this case I proceed in the following manner:

After having mixed the sulfur, water, and oxide of zinc with the revertex, the other saturating materials and the carbonate of ammonia as well, I add one or more of the proceeding coagulator charges. The latex coagulates and I continue as indicated in the example. In this case I may also add a neutral accelerator. A basic accelerator would have coagulated immediately after the addition of carbonate of ammonia, as previously indicated.

I may also replace the sulfur by sulfur color in solution. In this case I diminish the quantity of water added.

Finally to all these products entering in the manufacture of sponges I may add accelerators of vulcanization having a rapid action in order to accelerate the baking operation, as well as emollient bodies.

The sponge obtained by my method being white may be colored as desired, perfumed and sterilized.

Having described my invention what I claim as new and desire to secure by Letters Patent is:

1. In a process for manufacturing artificial sponge of rubber comprising coagulating latex on gas-liberating bodies and heating the whole, first mixing the latex with an organic base and then adding to the mass carbonate of ammonia in the solid state.

2. In a process for manufacturing artificial sponges of rubber comprising coagulating latex on gas-liberating bodies and heating the whole, first mixing the latex with an organic base of the guanidine series and then adding to the mass carbonate of ammonia in the solid state.

3. A process for manufacturing artificial sponges of rubber consisting in first mixing latex with an organic base, then adding to the mass carbonate of ammonia in the solid state and heating the whole to a temperature of about 140° C. for a period of one to three hours in the presence of an inert medium.

4. In a process for manufacturing artificial sponges of rubber comprising coagulating latex on gas-liberating bodies and heating the whole, first mixing the latex with an organic base and vulcanizing materials such as sulphur and sulphides and then adding to the mass carbonate of ammonia in the solid state.

5. In a process for manufacturing artificial sponges of rubber comprising coagulating latex on gas-liberating bodies and heating the whole, first mixing the latex with an organic base and charging materials, such as kaolin, chalk, and the like, and then adding to the mass carbonate of ammonia in the solid state.

6. A process of manufacturing artificial sponges of rubber comprising first mixing 100 parts of latex with 1 part of an organic base of the guanidine series, 5 parts of sulphur, 4 parts of zinc oxide and water, then adding to the mass 12 parts of ammonium carbonate in the powdered state and finally heating the whole to a temperature of about 140° C. for a period of one to three hours.

In testimony whereof I have signed this specification.

YVES CORNIC.